US010222874B2

(12) United States Patent
Dillon

(10) Patent No.: US 10,222,874 B2
(45) Date of Patent: Mar. 5, 2019

(54) MULTI-FUNCTION FOOT CONTROLLER WITH MOUSE AND IMPROVED SHORTCUT COMMAND

(71) Applicant: Robb Dillon, Atlanta, GA (US)

(72) Inventor: Robb Dillon, Atlanta, GA (US)

( * ) Notice: Subject to any disclaimer, the term of this patent is extended or adjusted under 35 U.S.C. 154(b) by 0 days.

(21) Appl. No.: 15/719,436

(22) Filed: Sep. 28, 2017

(65) Prior Publication Data

US 2018/0088684 A1    Mar. 29, 2018

Related U.S. Application Data

(60) Provisional application No. 62/401,156, filed on Sep. 28, 2016.

(51) Int. Cl.
*G06F 3/033*    (2013.01)
*G06F 3/038*    (2013.01)

(52) U.S. Cl.
CPC .......... *G06F 3/0334* (2013.01); *G06F 3/0383* (2013.01)

(58) Field of Classification Search
CPC ............................. G06F 3/0334; G06F 3/0383
See application file for complete search history.

(56) References Cited

U.S. PATENT DOCUMENTS

| | | | | |
|---|---|---|---|---|
| 3,830,002 | A * | 8/1974 | Volkmar ................. | F41A 17/72 42/70.08 |
| 6,225,977 | B1 * | 5/2001 | Li ............................ | G05G 1/52 345/156 |
| 8,487,872 | B2 * | 7/2013 | McAlindon ........... | G06F 3/0235 345/156 |
| 2008/0129695 | A1 * | 6/2008 | Li ........................ | G06F 3/0334 345/163 |
| 2010/0001948 | A1 * | 1/2010 | Logue ..................... | G06F 3/011 345/156 |
| 2011/0084902 | A1 * | 4/2011 | Logue ..................... | G06F 3/011 345/157 |

\* cited by examiner

*Primary Examiner* — Charles Hicks
(74) *Attorney, Agent, or Firm* — Clayton, McKay & Bailey, PC

(57) ABSTRACT

A foot-controlled device is presented herein that allows a user to control mouse movement on a computing device with their foot. The foot-controlled device includes a foot pad that the user can move in an X-Y plane. The pad can also can be pressed downward along the Z-axis, causing the foot-controlled device to issue a command. The command can be based on the mode of the foot-controlled device, such as a mouse mode or a directional pad mode. The command can also cause the foot-controlled device to switch modes. Additionally, rotation of the foot-controlled device can be used to determine which command to issue to the computing device.

20 Claims, 14 Drawing Sheets

MULTI-FUNCTION FOOT CONTROLLER WITH MOUSE AND IMPROVED SHORTCUT COMMAND

CROSS-REFERENCE TO RELATED APPLICATIONS

This application is a non-provisional application that claims benefit of priority to provisional application No. 62/401,156, filed Sep. 28, 2016, which is incorporated by reference in its entirety.

BACKGROUND

Controlling a computing device is typically done using a mouse, track pad, touch screen, or trackball. All of these control devices require a user to use their hands. In some activities, the user might not have a free hand to control the cursor, application, or hardware. Users can lose focus on a task when they have to use their hands to control a cursor or enter shortcut commands. This is true in the context of musicianship, gaming, manufacturing, medical, dental, accounting, graphic design, and other fields. Most controllers in these areas require both hands, such as guitar, keyboard, stringed and woodwind instruments, game controllers, and controls for medical devices. For example, musicians are limited in their ability to control software, such as mouse functionality, while playing. Other types of users are similarly prevented from using a typical hand-controlled input device. Even in conventional uses, a hand-controlled input device such as a mouse can require a user to stop typing in order to use the mouse. In short, the user can lose focus on their task based on the limited interfaces available to software and hardware.

Attempts to address the need for a foot-controlled mouse or other controller have been largely unsuccessful. Because feet and toes do not have the dexterity of fingers, foot-based mice have not yet solved the combination of both controlling a cursor and clicking. It can be difficult to navigate to a precise spot on screen and also click the spot, all using one or both feet. For example, a foot-controlled mouse can include a pad that slides or tilts in different directions to move the cursor. However, a separate button is usually provided for clicking. When the user takes their foot off of the pad, they can inadvertently move the mouse off of the target. They can also lose their balance if they are standing up. Similarly, putting their foot back onto the pad can cause the cursor to move unintentionally. In many applications, it is not possible to control the pad with one foot while controlling all clicking with the other foot. For example, a musician must keep a foot on the ground for balance during a performance unless they are sitting down.

Additionally, when certain functions need to be repeated multiple times, it can be difficult for the user to repeatedly access the correct function by using their feet. As an example, if a user is recording music, they might wish to repeatedly record and playback segments. In fact, up to 30% of a musician's time in recording is spent doing just that. Using their foot to navigate between these functions can be cumbersome. This is particularly true when musicians are learning to play a song or are following a lesson and need to repeatedly pause and return to a particular part.

Existing foot-controlled mice, such as those disclosed in U.S. Pat. No. 9,522,324, do not allow a user to easily switch between directional or mouse functionality and pre-assigned functions. Instead, the foot-controlled mouse is limited to a single mode while being used in an application.

Therefore, a need exists for an improved foot-controlled multi-function controller, and specifically one that allows a user to manage mouse and short-cut functions by switching between mouse control and programmed functions without using hands.

SUMMARY

The examples described herein specifically address technical problems and limitations of present foot-controlled (e.g., hands free) input devices.

The foot-controlled device can include a base, a controller that communicates with a computing device, and a pad that is movably attached to the base by a shaft. The shaft has a neutral orientation along a Z-axis and the pad move in the X and Y directions, wherein the pad can be pressed down the Z-axis, causing the shaft to descend into the base and restrict the pad from moving in the X and Y directions. The controller sends Z information to the computing device based on the pad being pressed down the Z-axis.

The foot-controlled device can switch between modes, such as a mouse mode and a "SMASHclick" mode. The mouse mode sends directional movement information based on directional pad movement, whereas the SMASHclick mode associates directional pad movement with functions that can be executed on the computing device. The foot-controlled device can switch between the modes when a foot button is pressed. The foot button can be activated when the pad is pressed down the Z-axis in an example. Alternatively, a separate button on a top surface of the foot-controlled device can be used to switch modes.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EXAMPLES

Figure 1:
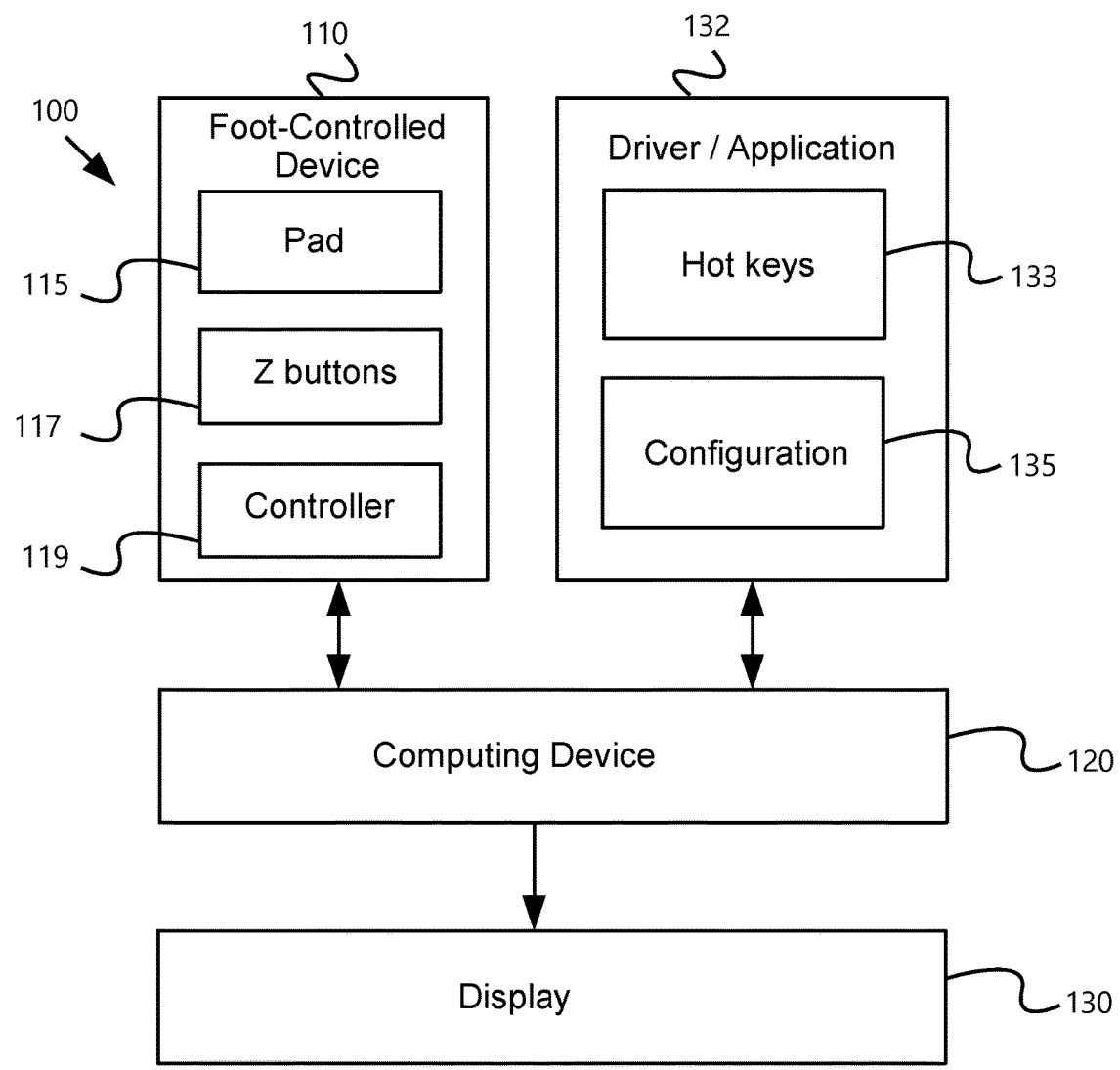
FIG. 1 is an exemplary illustration of system that integrates a foot-controlled device with a computing device.

Reference will now be made in detail to the present exemplary examples, including examples illustrated in the accompanying drawings. Wherever possible, the same reference numbers will be used throughout the drawings to refer to the same or like parts. The described examples are non-limiting.

An example mouse herein includes a base with a control pad that is attached to a base with a shaft. The shaft can allow the pad to lean in all directions along an X and Y axis, allowing the user to control a cursor. However, the user can also depress the pad along a Z axis. In one example, this can cause the shaft to slide into a recess in the base to perform a button press, such as a mouse click. The recess can include a washer that the shaft slides through or into. In one example, the user can tighten the shaft by twisting it. This can allow the user to adjust the firmness of the tilt, lean, or swivel.

In another example, a Z-button below the pad detects that the pad has been pressed downward. The pad can be coupled to a shaft, such as a joystick arm, that is in turn coupled to lower housing. The joystick arm can include a hinge that allows for movement freedom along an X and Y axis. In one example, a socket with a ball resides beneath the pad. The socket can be coupled to the joystick arm. The socket and pad can be separated by springs, allowing the user to press the pad down towards the socket without also causing the joystick arm to be pressed down. Instead, the Z-button beneath the pad is pressed by the downward movement of the pad against the springs.

In one example, while the pad is depressed, the recess can prevent the pad from lean on the X and Y axis so that the cursor remains still during a click. The shaft can be spring-loaded such that releasing the pad depression allows the shaft and pad to return to normal position along the Z axis. During this transition, the recess can provide stability to the pad so that unwanted cursor movement is minimized. In one example, only movements away from center are used to produce cursor movement. Movements that return the pad to center are not relayed to the driver in an example.

In one example, the pad can rotate around the Z axis when depressed. The rotation of the shaft can be used by a processor within the mouse to determine a left or right click. For example, depressing and swiveling right can be a right click. In another example, the rotation can be used to determine a different function. While the shaft is in the recess, a user can rotate the pad without causing the cursor to move. The shaft can be radially spring-loaded to return to a centered position.

In still another example, the foot-controlled mouse can include a function to switch into SMASHclick mode. For example, when the Z-button is pressed, the foot-controlled device can switch modes. SMASHclick mode sends functional commands to the driver 132 based on directional pad lean, turn, or depression. The SMASHclick mode can be accessed by a button on the base in one example. In another example, SMASHclick mode can be accessed by depressing and rotating the pad the opposite direction of a right click.

In SMASHclick mode, different directional leans of the pad can be assigned to different functions. This can allow the user to call up hotkey functions from the mouse by switching to SMASHclick mode and pressing the pad in a particular direction. In this way, the user can both access keyboard shortcuts and reliably control a mouse using a single foot. The functions assigned to the pad can be different for different applications. In one example, a driver can retrieve functions for whatever application is active and in the foreground. The driver can interact with the operating system of a computing device to determine which application is using the foot-controlled device in an example.

FIG. 1 includes an exemplary diagram of a system 100 in accordance with an example. A foot-controlled device 110 can control functions on a computing device 120, such as maneuvering a pointer that is visible on a connected display 130. The foot-controlled device 110 can include a pad 115 that can act as a 360 degree input along the X- and Y-axes. In one example, the pad 115 is connected to a base with a shaft mechanism. The shaft can allow the pad to lean in any direction, thereby giving the user to ability to push the pad any direction in the X- and Y-axis.

The pad 115 can act as a mouse in one example. A controller 119 can read the pad 115 orientation based on a series of sensors toward the base of the shaft. The sensors can be pressure sensors in one example. In another example, the sensors are optical sensors on the base that are directed upward at the pad and measure distance from the bottom of the pad to the base. When these sensors are placed along the X-axis and Y-axis, the sensors can be used to determine the pad's relative position with respect to those axes.

The foot-controlled device 110 can include a controller 119. The term controller and processor are used interchangeably. A controller 119 can be one or more processors, and a processor can be one or more controllers. The controller 119 can read the sensors to determine the pad's position. In one example, the controller 119 can format the sensor output for interpretation by a driver 132. The driver 132 can be firmware on the foot-controlled device 110 or can be a set of instructions that executes on another computing device 120, such as a tablet or computer. The term driver 120 can refer to any type of software, unless otherwise specified. In one example, a processor within the foot-controlled device 110 allows users to customize the multi-modal functionality of the foot-controlled device 110. For example, users can pre-program shortcuts that the foot-controlled device 110 can output in a series of data or commands, such that the foot-controlled device 110 can be used with multiple computing devices 110 without having to redo settings at each computing device 110.

The computing device 120 can be any processor-based device, such as a personal computer, laptop, tablet, or cell phone. It can also include or be part of a server in one example. The computing device 120 can execute a set of instructions stored locally or remotely on a computer-readable medium. The computing device 120 can execute the driver 132 in one example. In another example, the driver 132 can be an application that executes on the foot-controlled device 110 or some other device that is accessed by the computing device 120.

The controller 119 or driver 132 can translate the pad's 115 orientation and change in orientation into mouse movements. In one example, the user can set mouse operation so that only a change in orientation causes pointer movement. In another example, the user can set mouse operation so that pointer movement is based on the relative orientation of the pad 115. If the pad 115 is oriented outside of a centered position, the mouse will continue to move in a direction and rate dictated by the pad 115 orientation. For example, if the pad is held in an orientation right of center, the pointer will move to the right at a fixed rate.

The driver 132 can build a movement vector based on orientation information received from the controller 119. The movement vector can have a direction and a distance. The driver 132 can cause the computing device to update a pointer location based on the vector. This can include communicating with the operating system of the computing device 120 to control the pointer location.

In one example, the direction and distance of the vector corresponds to a change in orientation of the pad 115. A first X-Y coordinate is compared against a second X-Y coordinate by the driver 132. The vector is created between the two coordinates, and scaled based on settings for mouse sensitivity. When the two coordinates are at substantially the same location (based on sensitivity settings), the vector distance can be calculated as zero, causing the pointer to remain stationary. Similarly, when the X-Y coordinate is at neutral (e.g., centered) position, the driver 132 can create a zero distance vector, causing the pointer to remain stationary.

In one example, a spring-loaded return of the shaft (and pad 110) to neutral is detected by the controller 119 or driver 132. This movement can be omitted from vector calculation so that the pointer does not move based on the pad 115 returning to a neutral position. In one example, only movements away from center (i.e., neutral) are considered for vector movement of the pointer. This can ensure that the user can re-center the pad 115 without moving the pointer.

In another example, the user can apply a setting that causes both relative orientation and change in orientation to be used by the controller 119 or application 132 to create the movement vector. For example, the change in orientation can cause the distance of the movement vector to temporarily increase. Holding the pad still can cause the cause the vector to maintain a lowered distance value for a period of time, causing the pointer to continue on the trajectory. After the time period elapses, the distance can revert to zero, causing the pointer to remain still.

The pad 115 can also be used as expression control along two or three axes. This can allow a musician to control multiple expression commands at once from a single pedal, in an example. For example, up and down can control volume, whereas left and right can control fade or a frequency envelop. The Z-axis can control a third effect in one example. Similarly, a swivel of the pad 115 can also control an effect, such as taking volume from 0% to 100% based on the rotation of the pad 115.

The foot-controlled device 110 can include an adjustment member that strengthens or weakens the tension on the shaft. This can allow the user to ensure that the foot-controlled device 110 is comfortable to move for users of different weight and strength levels.

The foot-controlled device 110 can also include Z buttons 117, which can be one or more buttons pressed by pushing the pad 110 downward along the Z-axis into the base of the foot-controlled device 110. In one example, the user can perform a "click" action by pressing the pad 110 downward. The Z-axis can also allow the user to perform double clicks or click-and-hold functions, in an example.

The shaft itself can have one or more Z buttons 117 within it or underneath it. By pressing the pad 115 downward, one or more of the Z buttons 117 can be activated. In another example, the pad 115 is coupled to a socket via a ball and springs that reside between the socket and the pad 115. The socket can prevent the shaft from being pressed in the Z direction. Instead, a separate Z-button can extend upward and be pressed by the pad 115.

In one example, the shaft can slide into a recess in the base of the foot-controlled device 110. The recess can include a washer that guides the shaft downward. In one example, the washer can restrict X-Y movement of the shaft once it is pressed into the washer. This can help prevent unintended mouse movement when the user is activating a Z button 117, such as when the user is performing a click.

The Z buttons 117 can further include multiple buttons that are selected based on the swivel of the shaft. As will be explained with respect to FIGS. 4A and 4C, the swivel orientation can be used to select different functions with the Z buttons 117. For example, if a user swivels the pad 110 clockwise and pressed down, a Z button 117 corresponding to a right click can be activated. But if the user keeps the pad oriented at a neutral orientation, the Z button 117 can indicate a left click.

In one example, as the user swivels the pad 115, a friction mechanism causes the shaft to click as various rotation points are passed. This can allow the user to know that they have turned the pad 115 far enough to access a particular function using the Z button 117.

In one example, when the Z button 117 is activated, the controller 119 can determine the swivel of the shaft. Based on swivel reading, the controller 119 can report a different Z button 117 identifier to the driver 132. Based on the Z button 117 identifier, the driver 132 can determine a corresponding function. Alternatively, the controller 119 can report a swivel value that the driver 132 uses to determine a corresponding function to the Z button 117.

Other foot-activated switches can also exist on the foot-controlled device 110. For example, a dedicated switch can act as a right click in one example.

Another dedicated foot switch or Z button 117 function can cause the pad 115 to change between mouse mode and SMASHclick mode. In SMASHclick mode, the pad 115 acts as multiple buttons, such as up, down, left, and right. These buttons can be assignable to various functions. In one example, they default to arrow keys up, down, left, and right.

In another example, an application 132 provides a graphical user interface ("GUI") that allows the user to assign the SMASHclick buttons and other switches to various hot key 133 functions. The user can assign key presses to various buttons. In one example, the user can assign key presses to different Z button 117 swivel amounts.

When the GUI is launched, it can display current functions and shortcuts to other functions. It can also allow the user to switch between different SMASHclick profiles. The SMASHclick profiles can be stored for effective operation with different applications. For example, a digital audio workstation ("DAW") can have hotkeys for record, stop, and play. These can be stored in a first SMASHclick profile in association with the SMASHclick buttons. A practice application can have different hotkeys for record, stop, and play. These functions can be stored in a second SMASHclick profile. The user can use the GUI to select between the profiles. In another example, the driver 132 can receive information from the operating system of the computing device 120 regarding which application is in the foreground and automatically switch to compatible profile based on an application identifier being associated with a profile identifier. Example applications that can be used with the SMASHclick profiles include word processor applications, Internet browsers, media player applications, and others. For example, leaning the pad 115 left could cause a word processor to delete the last word, cause an Internet browser to go to the prior webpage or scroll the screen to the left, or cause a media player to rewind a song.

In another example, the GUI can allow the user to adjustable screen location and size properties. The GUI can display at a set portion of the screen or can be set for full-screen display. This can be stored as configuration data 135. Other configuration data 135 can include mouse or SMASHclick sensitivity.

The GUI can provide various options for graphics resizing to increase the ease of use of the foot-controlled device 110. These options can utilize functionality of the operating system of the computing device 120 for implementation. One option can be icon sizing. When selected, moving a cursor over an icon can cause the icon to increase in sizing. Alternatively, icon sizing can cause icons to display at larger than normal size to make it easier to navigate the cursor over them.

Another option includes a screen zoom. The entire screen can be zoomed in in one example, making everything bigger. In another example, a magnifying glass feature is incorporated around the cursor.

Still another option can include screen quadrants. The screen can be broken into different quadrants for functional grouping. A first quadrant can include icons related to mouse functionality, a second quadrant can include a play and record station, a third quadrant can include sound effects, and a fourth quadrant can include beats (e.g., drum machine functionality).

By clicking in one of the quadrants, the foot-controlled device can switch to the corresponding mode in one example.

Hot keys 133 and configuration data 135 can be stored in a database associated with the application 132. The database can be stored in a computer-readable medium on the foot-controlled device 110 in one example. This can allow the user to use the same foot-controlled device 110 with multiple different computing devices 120 without having to separately transfer profiles. Alternatively, the database can be implemented by any type of computing device 120.

In another example, the database is remotely accessible by the computing device 120, such as over a network. The network can be a local area network, an enterprise network, or the Internet. In one example, multiple computing devices 120 in an enterprise can remotely access the database over a network. This can allow for centralized storage and development of libraries of application-specific hot keys 133 and configurations 135. This can allow users to easily load settings that will work with an application they are using, streamlining setup of the foot-controlled device 110.

In another example, the pad 115 can be switched to a further mode where it can act as a drum pad. This can allow the user to create basic drum beats and fills while playing an instrument. Various drum sounds can be assigned to the pad. For example, down can active a bass drum, left can activate a snare, up can activate a high hat, right can activate a cymbal and a Z button 117 can activate a fill.

Other effects pedals can also be built into the foot-controlled device 110. For example, effects such as delay, reverb, fuzz, overdrive, and distortion can be built into the pedal. In one example, the user can switch to a mode where the pad 115 is used to dynamically control an effect parameter. The user can cycle through available parameters to control by hitting another switch or twisting the pad 115. This can allow the user to use a foot-controlled device 110 as an effects generator for a guitar, and as a mouse to control other effects outside the foot-controlled device 110.

The foot-controlled device 110 can include other ports, such as MIDI in and out and USB. The foot-controlled device 110 can be configured to send output signals on these ports for use in controlling virtual instruments or effects pedals. This information can be stored as part of the hot key 133 and configuration data 135.

Other connectivity features of the foot-controlled device 110 can include BLUETOOTH, WIFI, and other wireless technologies. This can allow the foot-controlled device to easily be connected for operation with a wide variety of computing devices 120. In one example, multiple foot-controlled devices 110 can connect to a single computing device 120 so that multiple users can collaboratively control the computing device 120. This can be useful in a recording or performance setting, such as when multiple musicians might need to adjust their personal mixes while playing.

Wired connections are also possible. For example, audio-video and Ethernet cables can be connected in an example. The connections are not intended to be limited to those specifically addressed herein.

In this way, the foot-controlled device 110 can be used with a computing device 120 to control any sort of software or hardware. For example, medical hardware or applications can be controlled with the foot-controlled device 110. Manufacturing, accounting, graphic design and other applications are also possible. The foot-controlled device 110 can be switched between a mouse mode and a functional mode in any setting, freeing up a user to use their hands and focus on their task.

Figure 2A:
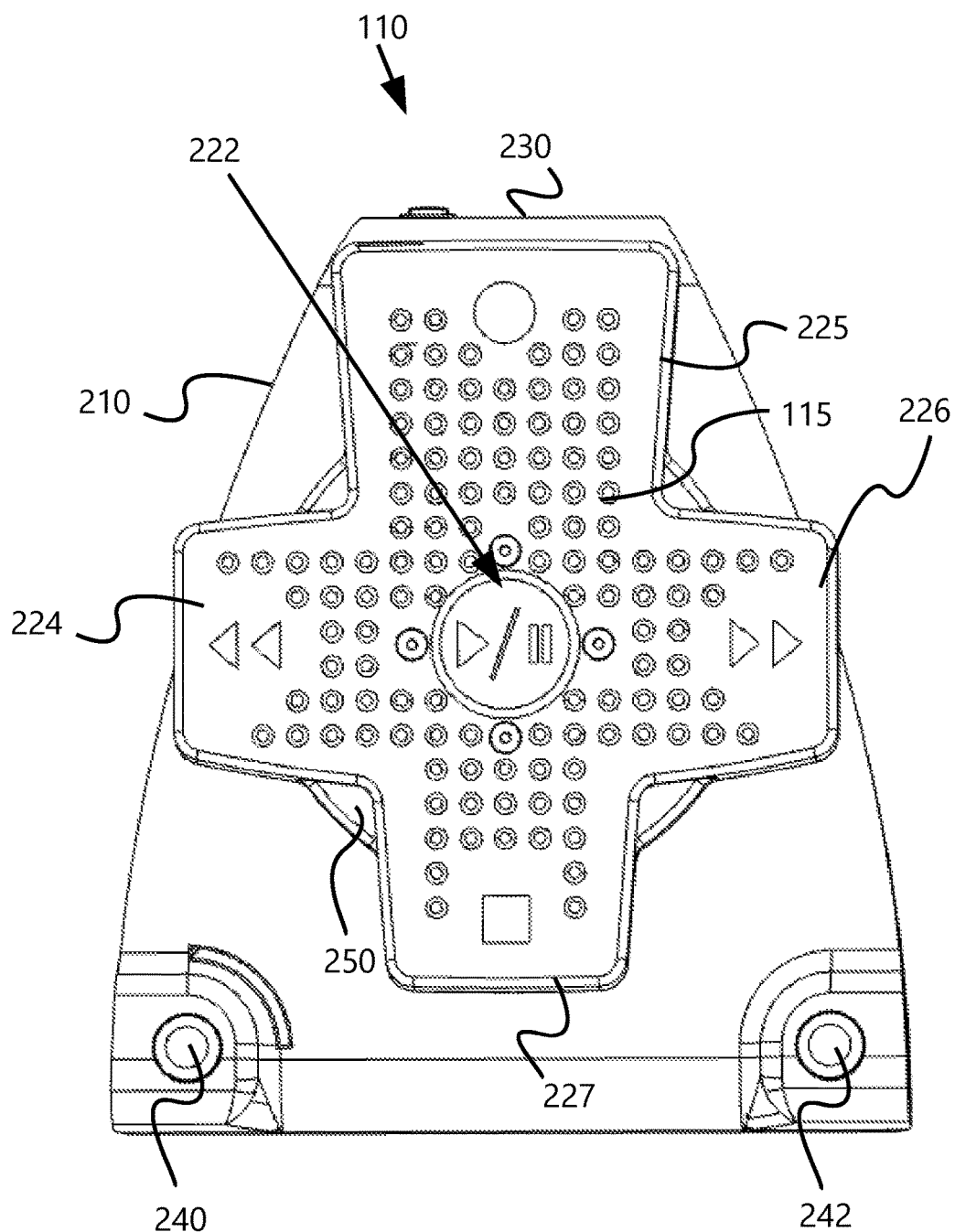
FIG. 2A is an exemplary illustration of a foot-controlled device.

FIG. 2A is an example illustration of a foot-controlled device 110. As illustrated, the pad 115 can be cross shaped to identify up 225, down 227, left 224, and right 226. Additionally, pressing the middle 222 of the pad can access the Z button(s) 117. The cross shape of the pad 115 can be longer than it is wide in one example. This can allow the user to more easily use all four directions and click functionalities for drum machines and other applications with their foot.

In one example, the user can switch the modes of the foot-controlled device 110 from a mouse mode to a function mode (i.e., SMASHclick mode) by pressing the pad 115 downward (i.e., along the Z-axis, into the page of FIG. 2A). This can allow the user to shift between mouse and pre-set functionalities on the pad 115 without using any other limbs to do so.

In the example shown, additional foot switches 240 and 242 can be assigned to various functions. For example, foot switch 242 can perform a right click. Foot switch 240 can cause the foot-controlled device 110 to toggle between mouse mode, SMASHclick mode, and other modes. Each mode can also change the functionality of foot switch 242. In another example, the foot switch 242 can access different shortcuts based on the user tapping foot switch 240. This can allow a user to dynamically layer functions or effects. In one example, the user can switch from SMASHclick mode to mouse mode by pressing and holding the pad 115. An LED or other indicator can visually differentiate the modes for the user, in an example.

In one example, foot switches 240, 242 can be programmed to move the cursor to a particular coordinate based on stored cursor locations. This can allow a user to move to predefined screen locations where the cursor will often be needed. For example, a guitar player can program switches to coordinates that correspond to with different effects adjustments on a GUI of a computing device 120. Other programmable cursor locations can include the location of GUI buttons, such as play or record. The foot switches 240, 242 can be numerous and not limited to those illustrated in FIG. 3.

Various inputs and outputs 230 can be located in the base 210 of the foot-controlled device 110. The base can also have a channel beneath it to run cables and wires that are commonly part of pedal boards and other performance-related setups. The outputs 230 can be of any known type and can allow the foot-controlled device 110 to connect to a variety of different devices, such as computers, effects processors, medical devices, and others.

In one example, the outputs 230 can include a ¼ inch jack for connecting a guitar cable or an input from another musical instrument. The foot-controlled device 110 can have a built-in effects processor that can be loaded with effects. The foot-controlled device 110 can toggle between effects while in a local effects mode. The outputs 230 can also have an output for connecting the foot-controlled device 110 to an amplifier or DAW, outputting the manipulated audio of the built-in effects processor.

In one example, the outputs 230 can be used to link multiple foot-controlled devices 110 together. For example, first and second foot-controlled devices 110 could allow a user to use both feet to control a cursor and launch various functions in SMASHclick mode or other modes.

The foot-controlled device 110 can also include a battery to power aspects of the foot-controlled device 110. The battery can be rechargeable. Additionally or alternatively, it can include an input 230 for a power supply.

Figure 2B:
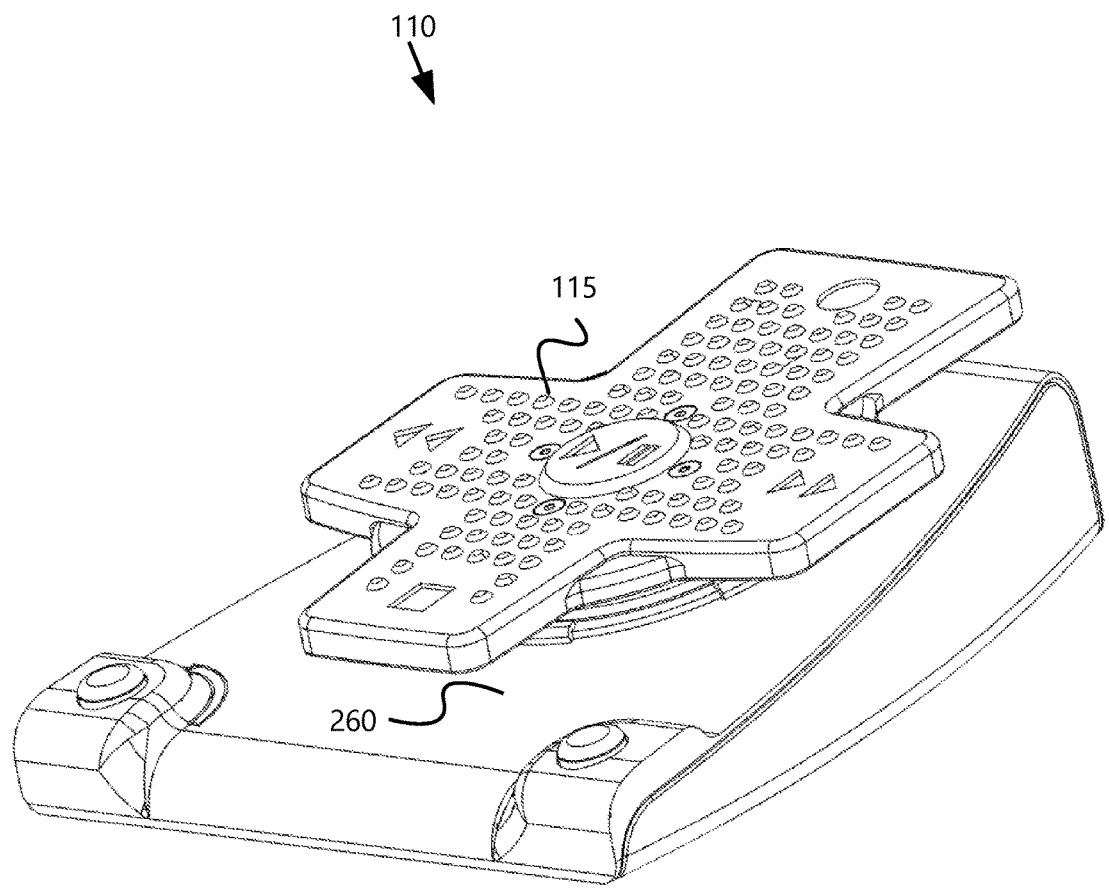
FIG. 2B is an exemplary illustration of a foot-controlled device.

FIG. 2B is a perspective view of the foot-controlled device 110. The pad 115 of the foot-controlled device 110 can sit raised above a top housing 260 so that the user can push the pad 115 down in any direction. This can be considered X-Y movement for the purposes of this disclosure.

Figure 2C:
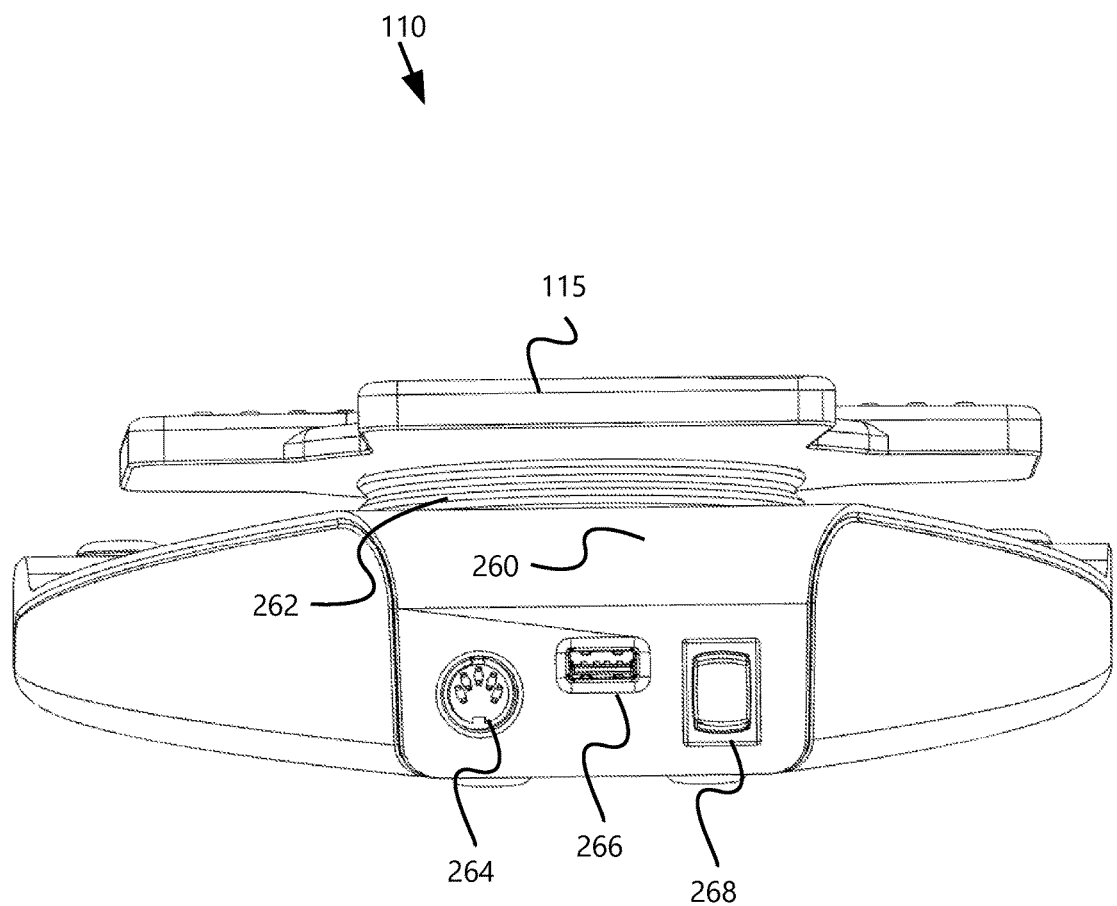
FIG. 2C is an exemplary illustration of a foot-controlled device.

FIG. 2C is a back view of the foot-controlled device 110. In this example, the foot-controlled device 110 includes a MIDI port 264. The MIDI port 264 can be used to send effects or note commands to and from a MIDI-enabled device, such as a sound module or keyboard. In one example, a function can be programmed to generate MIDI information. For example, in SMASHclick mode, the up direction 225 on the pad 110 can cause the foot-controlled device 110 to send a patch change MIDI signal to an external device.

The foot-controlled device 110 also includes a USB port 266. The USB port 266 can allow the foot-controlled device 110 to connect to a computing device 120. The foot-controlled device 110 can send signals to the computing device 120 where a driver executes, in an example. This can allow the foot-controlled device 110 to send basic signals that the driver then translates into the correct functionality. For example, the driver can keep track of whether the foot-controlled device 110 is in mouse mode or some other mode, and interpret the signals accordingly. The USB port can also be used to power or charge the foot-controlled device 110.

The MIDI port 264 or USB port 264 can also allow the foot-controlled device 110 to be used in stand-alone mode in an example. In stand-alone mode, the foot-controlled device 110 can receive an input, such as a guitar input, and apply built-in effects to the guitar signal. The effects can be applied and the signal be altered based on pad 115 movement. Then the altered signal can be sent out either digitally or in analog. A digital out can be the USB port 264. Alternatively, effects controls can be output via the MIDI output 264.

A power switch 268 can also be located on the back of the foot-controlled device 110. This can allow the foot-controlled device 110 to be turned off.

The foot-controlled device 110 can include a rubber boot 262 that hides the springs and socket between the pad 115 and the upper housing 260. The rubber boot 262 can also assist springs with returning the pad 115 to a neutral position in an example. The rubber boot 262 can further hide a Z-button that gets activated when the user presses down on the pad 115. This hidden Z-button can switch modes in an example.

Figure 2D:
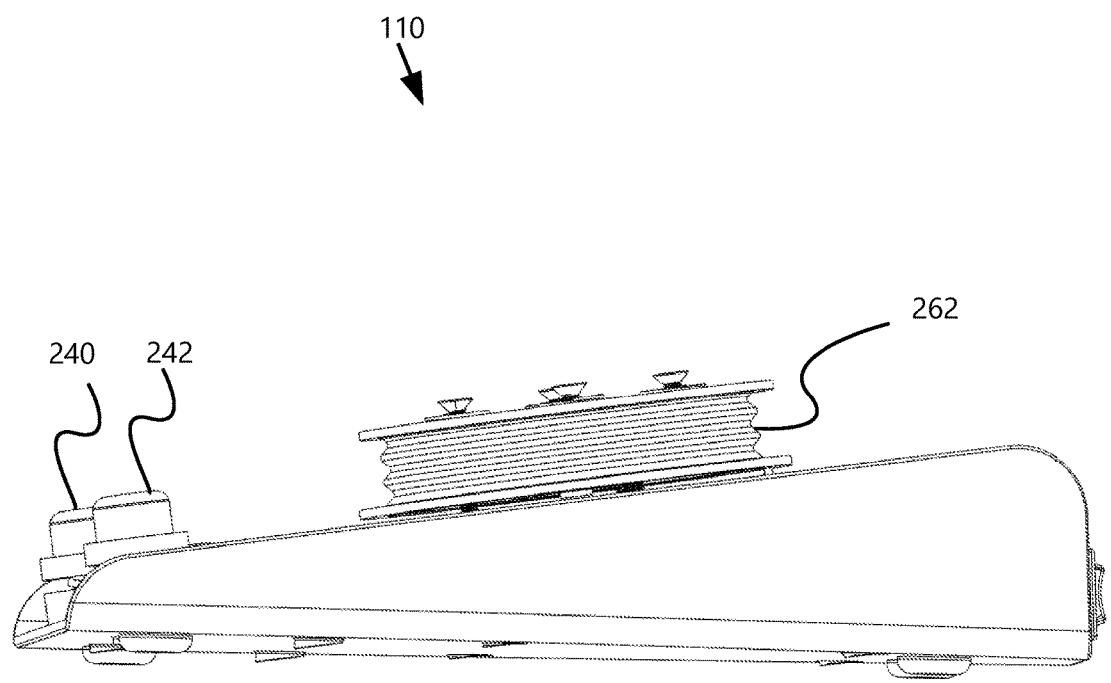
FIG. 2D is an exemplary illustration of a foot-controlled device.
Figure 2E:
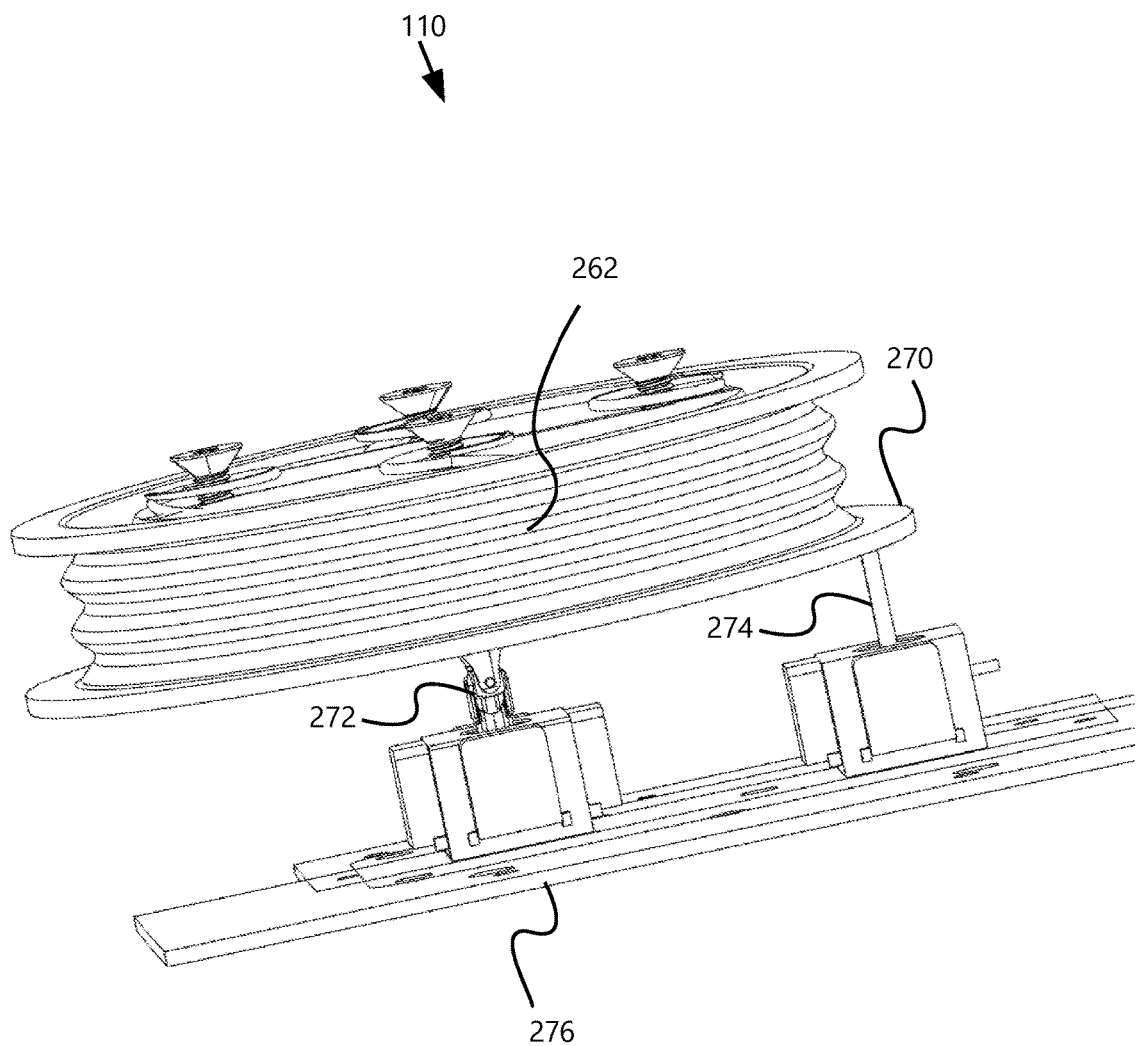
FIG. 2E is an exemplary illustration of a foot-controlled device.

FIGS. 2D-2G show various illustrations of a foot-controlled device 110 in states of disassembly. FIG. 2D shows the foot-controlled device 110 without the pad 115. FIG. 2E shows the foot-controlled device 110 without a body or housing. A sheath 270 resides below the pad 115. This can allow the pad to control a joystick 272 for moving a mouse based on X-Y movements on the pad 115. The joystick 272 can be attached to the printed circuit board 276 in an example. The joystick 272 can have an X-Y hinge that allows it to bend in any X-Y direction pressed on the pad 115.

The sheath 270 can prevent the joystick 272 from moving in a Z direction towards the printed circuit board 276. However, the sheath 270 or pad 115 can press down on a Z button 274, such as for switching modes of the foot-controlled device 110.

Figure 2F:
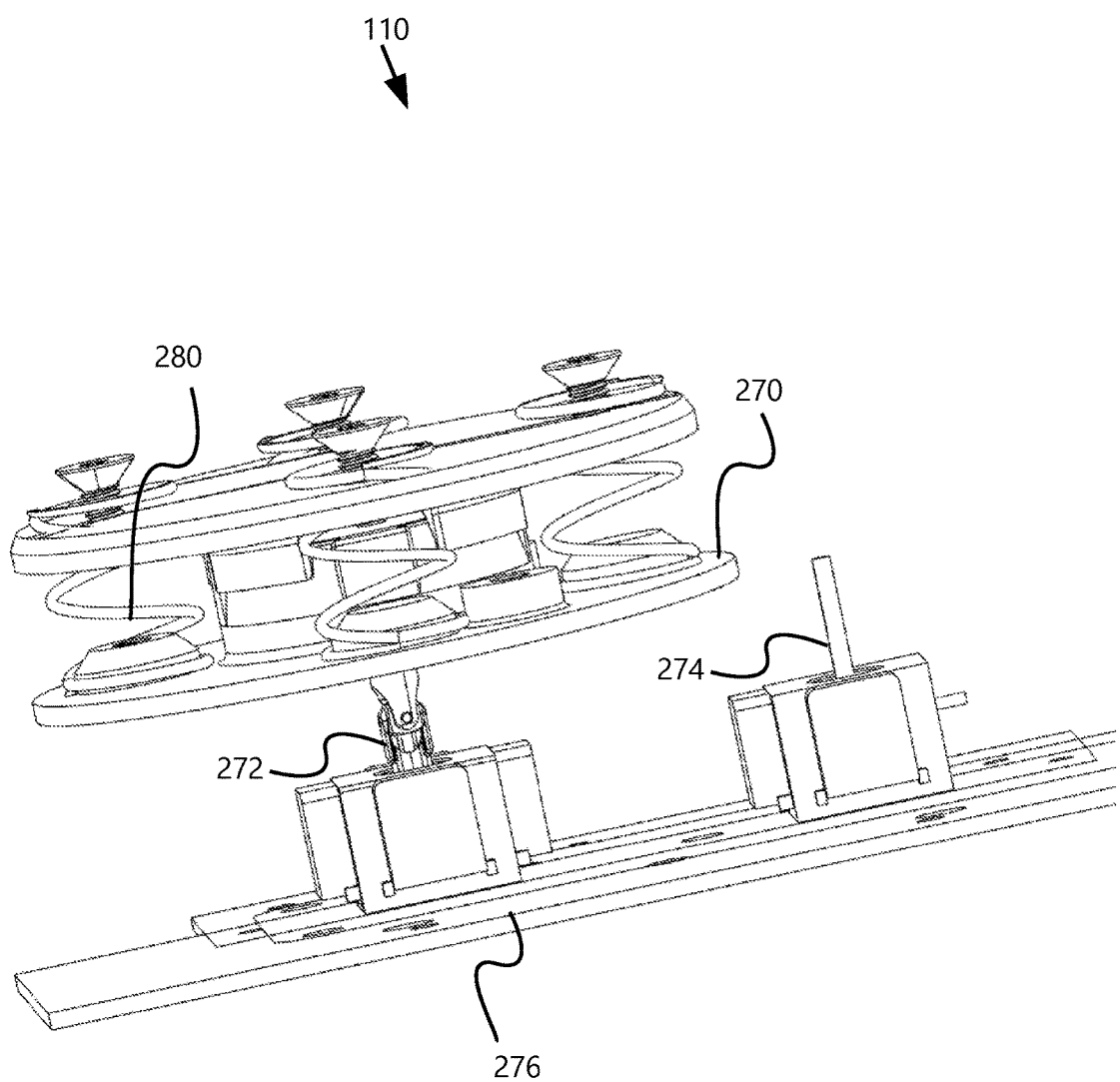
FIG. 2F is an exemplary illustration of a foot-controlled device.
Figure 2G:
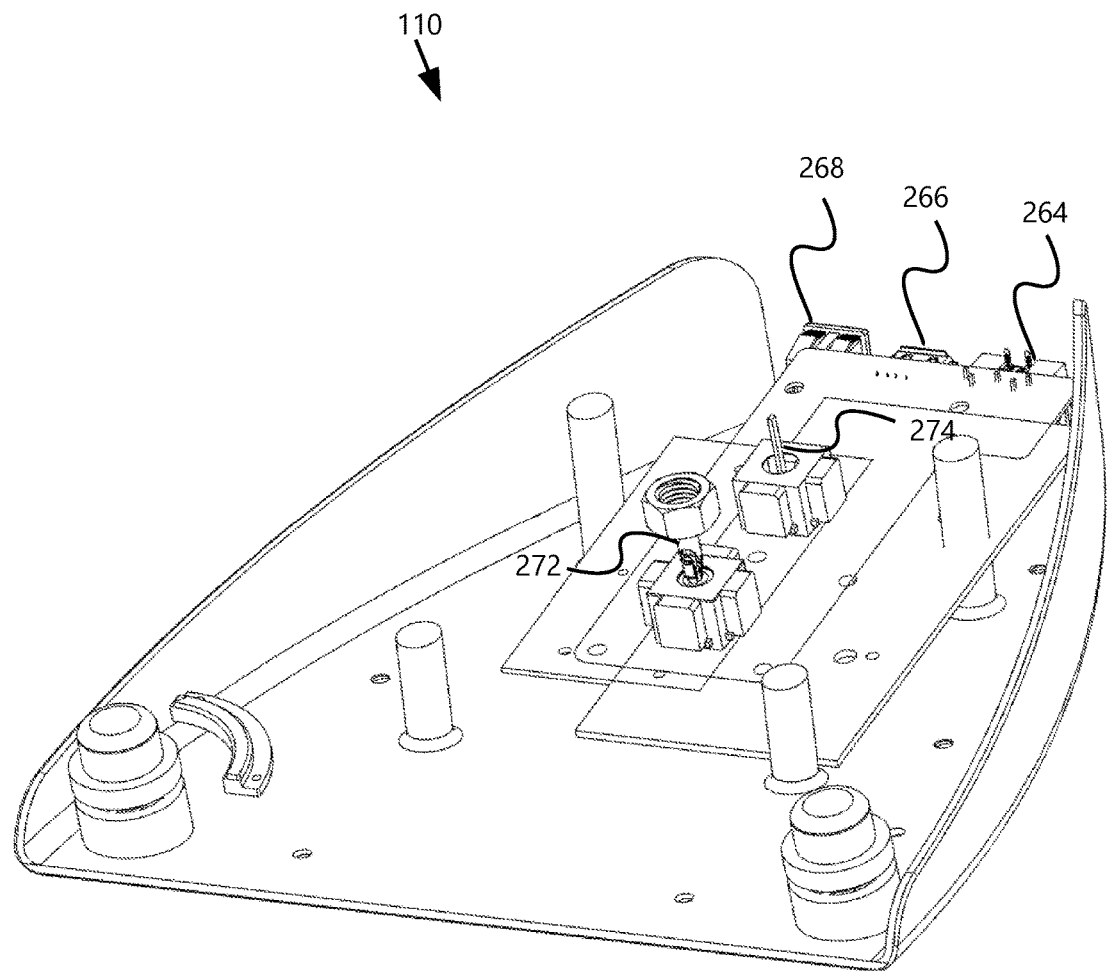
FIG. 2G is an exemplary illustration of a foot-controlled device.

FIG. 2F includes a similar view to FIG. 2E, with the rubber boot 262 removed. Springs 280 can support the pad 115 at a neutral position relative to the sheath 270. When the pad 115 is pressed to move in the X-Y directions, the springs can give way to the pad 115. FIG. 2G shows the foot-controlled device 110 with the pad 115, boot 262, sheath 270, and upper housing 260 all removed.

Figure 3:
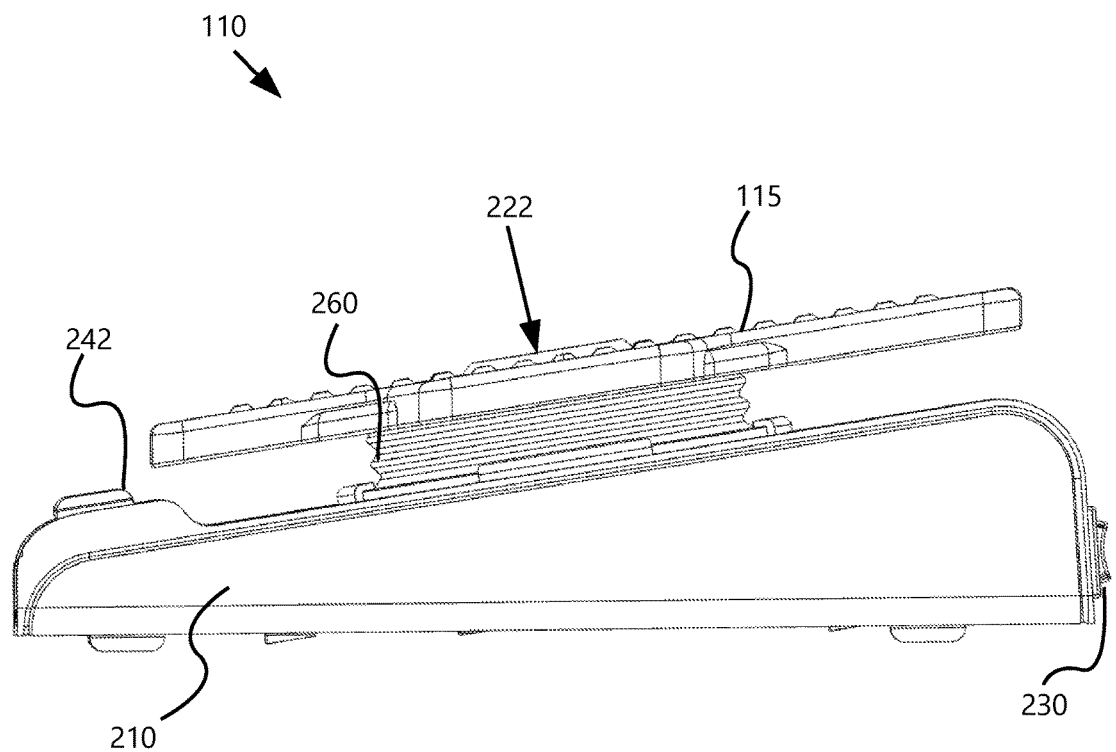
FIG. 3 is an exemplary illustration of a foot-controlled device.

FIG. 3 shows an example illustration of a side view of the foot-controlled device 110. A rubber boot 260 acts as a washer between the base 210 and the pad 115 can provide stability to the pad 115. In one example, as the pad 115 is cushioned against hitting the base 210. In another example, the rubber boot 260 includes a cylinder that the shaft extends through into the base 210. When the user presses down on the pad 115, the rubber boot 260 can compress against the sheath 270. In one example, the shaft (i.e., joystick 272) attaches to the sheath 270 such that it does not get pressed in the Z direction. Instead, the Z-button 274 gets pressed in the Z direction.

In another example, when the user presses down on the pad 115 center 222, the shaft can slide into a recess, which can prevent movement in the X-Y directions. The recess can simultaneously still allow swiveling around the Z-axis in one example. A twist mechanism can be provided for tightening the washer in one example, to provide additional resistance to pad movement.

Figure 4A:
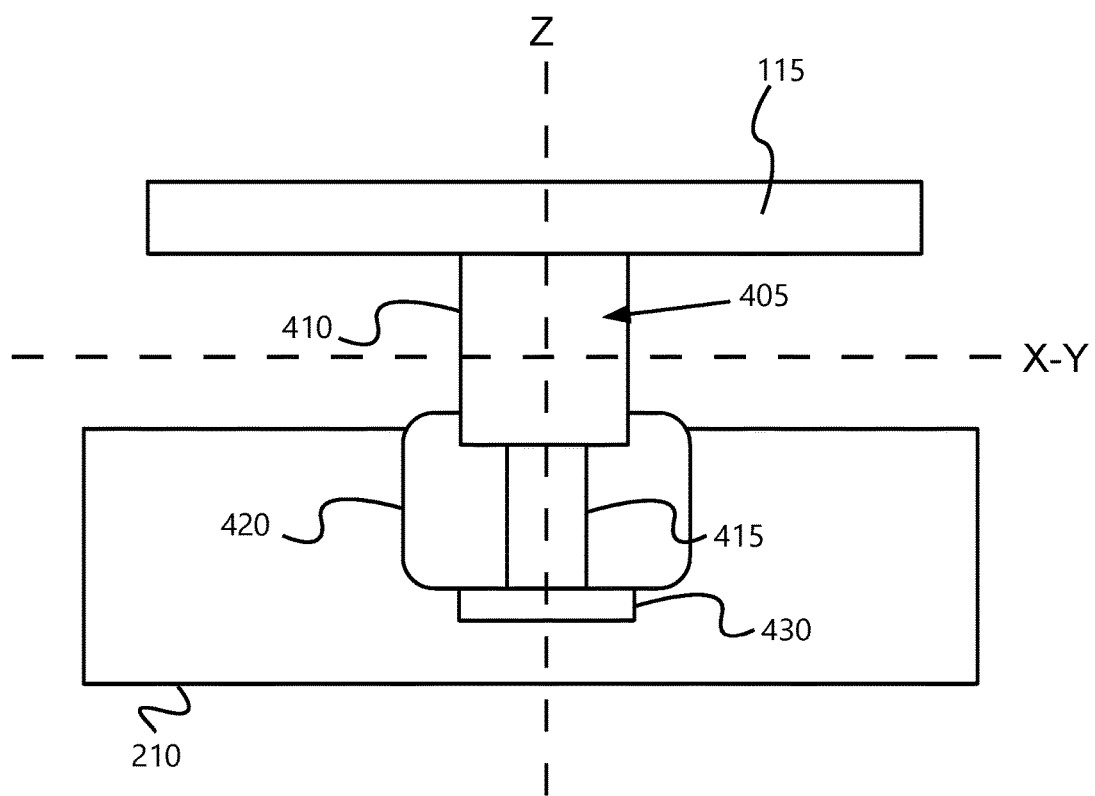
FIG. 4A is an exemplary illustration of a vertical stabilizing mechanism.
Figure 4B:
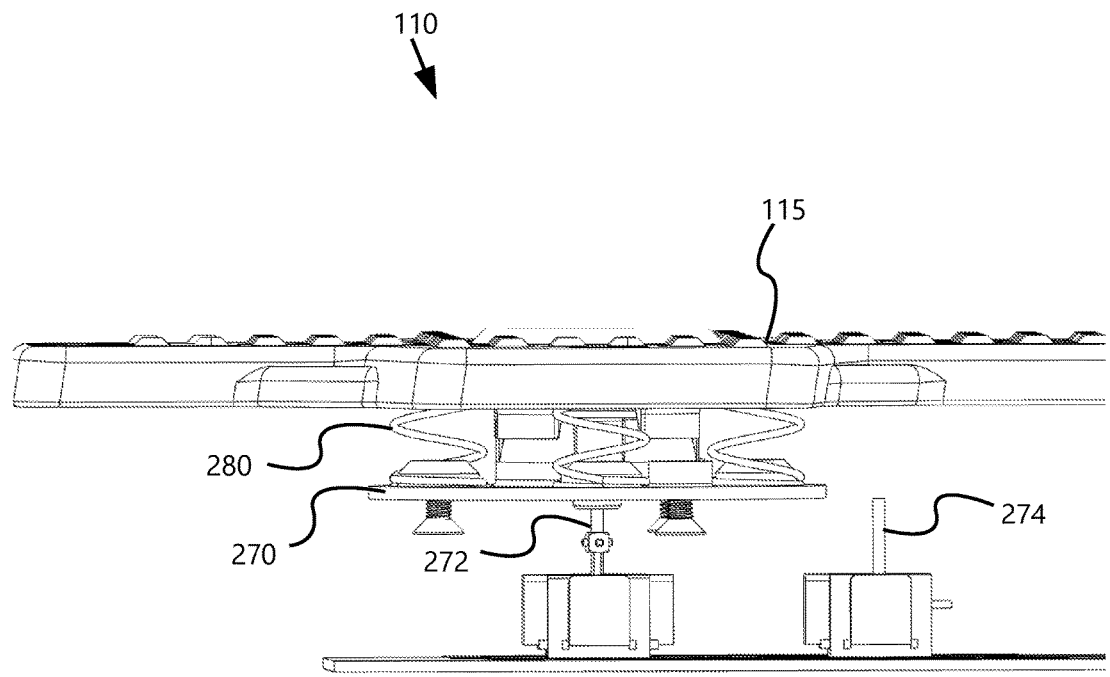
FIG. 4B is an exemplary illustration of a vertical stabilizing mechanism.

FIG. 4A is an example cross-section of the foot-controlled device 110. A shaft 405 having an upper portion 410 and a lower portion 415 can extend into the base 210 of the foot-controlled device 110 along the Z-axis. In this example, the shaft 405 extends through washer 420 into the base 210. When the user presses down on the pad 115, the upper portion 410 of the shaft 405 slides downward over the lower portion 415.

Sensors within the shaft 405 can detect the downward pressure and act as Z buttons 117 in an example. In one example, the lower portion 415 is fixed to a bottom plate 430 in a manner that prevents the bottom portion 415 from swiveling. The upper portion can swivel around the Z-axis. Sensors within the shaft 405 can detect the relative swivel of the upper portion 410 compared to the lower portion 415. This can allow the controller 119 or driver 132 to determine the amount of swivel of the pad 115. According to the amount of swivel, the correct Z button 117 function can be selected.

In another example, sensors or buttons on a bottom plate 430 can detect pressure caused by downward force of the upper portion 410 of the shaft 405. The pressure can either be indirect, such as through washer 420, or caused by direct contact between the upper portion 410 and the plate 430.

Figure 4C:
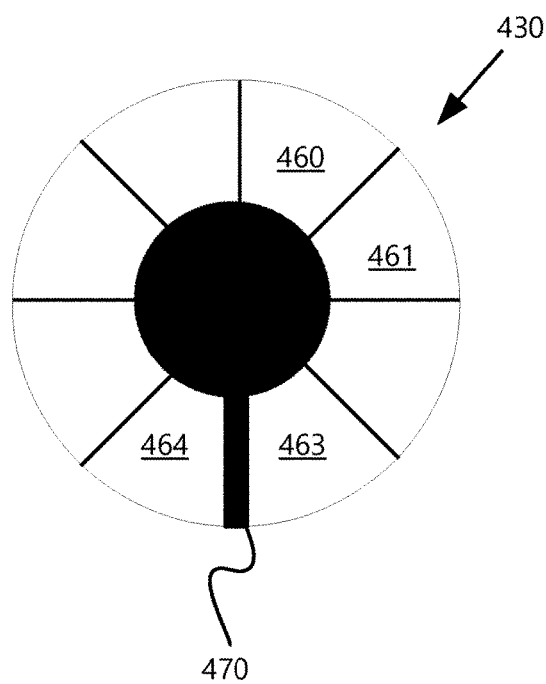
FIG. 4C is an exemplary illustration of a vertical stabilizing mechanism.

In another example, as shown in FIG. 4C, the shaft 272 can rotate or bend on the X-Y axis, but Z-direction pressure is shielded by the sheath 270. Instead, a Z button 274 receives the Z-direction pressure.

In still another example, FIG. 4C illustrates a top-down view of the bottom plate 430. As shown, the bottom plate can be divided into regions, including regions 460, 461, 463, and 464. These regions can represent swivel points that are assignable to different Z button 117 functions in an example. Any number of regions can be used, such as four regions. The illustrated example includes 8 regions.

In one example, the regions 460, 461, 463, and 464 each have a sensor that acts as a different Z button 117. The sensors can detect whether a protrusion at the bottom of the upper portion 410 of the shaft is applying pressure to the respective region of the bottom plate 430. When the user rotates the pad 1115, the protrusion on the shaft is rotated into a different region 460, 461, 463, and 464. The combination of rotating and pressing downward can cause the respective sensor to output to the controller 119, allowing the controller 119 to determine the amount of swivel or report the correct Z button 117 identifier to the driver 132.

Alternatively, the different regions can be similarly detected by sensors on the inside of the shaft 405. The shaft 405 can have sensors or conductive contacts on the outer surface of the lower portion 415 and inner surface of the upper portion 410. When these sensors or conductors contact each other, the controller 119 can gauge the amount of rotation.

A blocking member 470 can be present on the bottom plate 430 or inside the shaft 405 to restrict the pad 115 from rotating too far. In one example, the shaft 405 is spring-loaded against the blocking member to make the pad 115 progressively more difficult to rotate and to help return the pad 115 to a neutral position.

Figure 5:
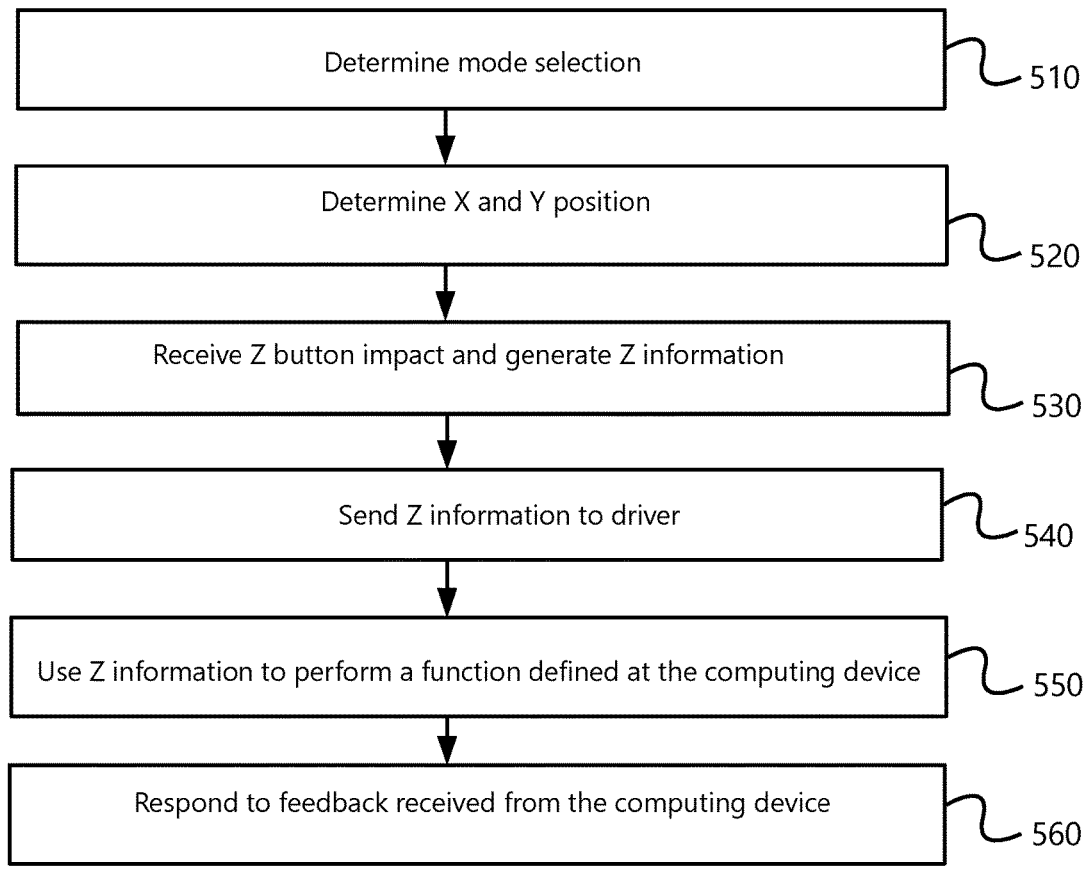
FIG. 5 is an exemplary flow chart.

FIG. 5 is an example flowchart showing stages that can be performed by a foot-controlled device 110. At stage 510, the foot-controlled device 110 can detect a mode selection by the user. This can occur when the user steps on a dedicated foot switch in one example. In another example, a foot switch, pad 115 direction, or Z button 117 is set to the mode switching function by the user. In this case, the mode selection can be determined by a driver or other application on either the foot-controlled device 110 or on a computing device 120.

At stage 520, the controller 119 can determine the position of the pad in the X-Y plane. This can include sensing hose for the shaft is from center in both the X and Y directions. It can be achieved by any applicable joystick technology in one example, such as placing pressure sensors within the base 210 along the X-axis and Y-axis.

The controller 119 or driver 132 can also determine a movement vector based on a difference in the detected X-Y coordinate from a previous X-Y coordinate. The movement vector can be used to direct pointer movement in mouse mode. It can also be used to determine a function in SMASHclick mode or in another mode.

At stage 530 the controller 119 can receive a sensor input indicating a Z button 117 impact. This can occur when the user presses down on the pad 115. The Z-button 117 impact can cause the controller 119 to determine the Z-axis swivel amount of the pad 115 in an example. In another example, the Z button 117 output contains enough information for the controller 119 to already determine the swivel.

At stage 540, the controller 119 can send Z information to the driver 132. The Z information can identify a Z button that was impacted in one example. In another example, it can identify a swivel amount. In another example, the Z information can merely indicate that the Z button 117 was activated.

At stage 550, the driver can utilize the Z information to perform a function at the computing device. The driver can determine what function is assigned to the Z button in an example. The function can be a saved function that is determined by the user. Alternatively, it can be a click function.

At stage 560, the driver 132 can cause the computing device 120 to send feedback to the foot-controlled device 110. The foot-controlled device 110 can vibrate or click in one example. This can be useful when the audio of the computing device 120 is being used for music or otherwise should not be interrupted.

Figure 6:
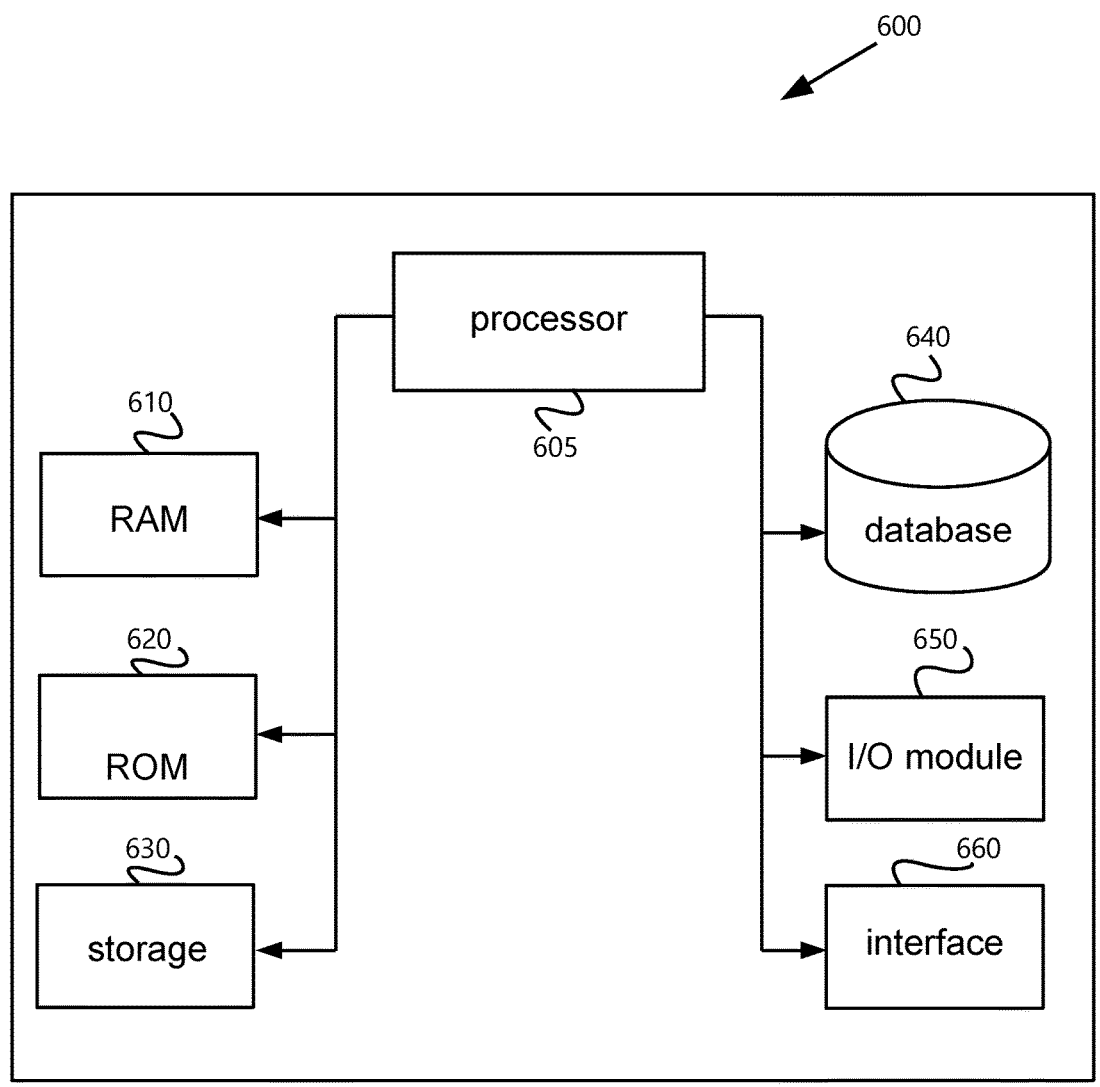
FIG. 6 is an exemplary illustration of system components.

FIG. 6 depicts an exemplary processor-based computing system 600 representative of the type used in the foot-controlled device 110 and/or computing device 120 of FIG. 1. Continuing with FIG. 6, the computing system 600 is exemplary only and does not exclude the possibility of another processor- or controller-based system being used in or with one of the aforementioned components. Additionally, a server or other computing device 120 need not include all the system hardware components in an example.

In one aspect, system 600 may include one or more hardware and/or software components configured to execute software programs, such as software for storing, processing, and analyzing data. For example, system 600 may include one or more hardware components such as, for example, processor 605, a random access memory (RAM) module 310, a read-only memory (ROM) module 620, a storage system 630, a database 640, one or more input/output (I/O) modules 650, and an interface module 660. Alternatively and/or additionally, system 600 may include one or more software components such as, for example, a computer-readable medium including computer-executable instructions for performing methods consistent with certain disclosed embodiments. It is contemplated that one or more of the hardware components listed above may be implemented using software. For example, storage 630 may include a software partition associated with one or more other hardware components of system 600. System 600 may include additional, fewer, and/or different components than those listed above. It is understood that the components listed above are exemplary only and not intended to be limiting.

Processor 605 may include one or more processors, each configured to execute instructions and process data to perform one or more functions associated with system 600. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 6, processor 605 may be communicatively coupled to RAM 610, ROM 620, storage 630, database 640, I/O module 650, and interface module 660. Processor 605 may be configured to execute sequences of computer program instructions to perform various processes, which will be described in detail below. The computer program instructions may be loaded into RAM for execution by processor 605.

RAM 610 and ROM 620 may each include one or more devices for storing information associated with an operation of system 600 and/or processor 605. For example, ROM 620 may include a memory device configured to access and store information associated with system 600, including information for identifying, initializing, and monitoring the operation of one or more components and subsystems of system 600. RAM 610 may include a memory device for storing data associated with one or more operations of processor 605. For example, ROM 620 may load instructions into RAM 610 for execution by processor 605.

Storage 630 may include any type of storage device configured to store information that processor 605 may need to perform processes consistent with the disclosed embodiments.

Database 640 may include one or more software and/or hardware components that cooperate to store, organize, sort, filter, and/or arrange data used by system 600 and/or processor 605. For example, database 640 may include user-specific information, including password information, along with configuration profiles 135 and hot keys 133. Alternatively, database 640 may store additional and/or different information. Database 640 may also contain a plurality of databases that are communicatively coupled to one another and/or processor 605, which may be one of a plurality of processors utilized by server 630.

I/O module 650 may include one or more components configured to communicate information with a user associated with system 600. For example, I/O module 650 may include a console with an integrated keyboard and mouse to allow a user to input parameters associated with system 600. I/O module 650 may also include a display including a GUI for outputting information on a monitor. I/O module 650 may also include peripheral devices such as, for example, a printer for printing information associated with system 600, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 660 may include one or more components configured to transmit and receive data via a communication network, such as the Internet, a local area network, a workstation peer-to-peer network, a direct link network, a wireless network, or any other suitable communication platform. For example, interface 660 may include one or more modulators, demodulators, multiplexers, demultiplexers, network communication devices, wireless devices, antennas, modems, and any other type of device configured to enable data communication via a communication network.

Other embodiments of the invention will be apparent to those skilled in the art from consideration of the specification and practice of the invention disclosed herein. It is understood that the examples can operate with more than just music applications. It is intended that the specification and examples be considered as exemplary only, with a true scope and spirit of the invention being indicated by the following claims.

What is claimed is:

1. A foot-controlled device, including:
   a base;
   a controller that communicates with a computing device; and
   a pad that is movably attached to the base by a shaft, the pad receiving input from a user's foot to move the pad in X and Y directions, wherein the shaft has a neutral resting orientation along a Z-axis and wherein the pad can be pressed down the Z-axis to perform a left click action; and
   a foot switch on the base to switch the foot-controlled device between at least three modes, including a mouse mode, a function mode, and an expression mode, wherein each of the three modes utilizes X-Y movements on the pad, and wherein:
      the mouse mode causes a first X-Y movement on the pad to control a cursor on a screen;
      the function mode causes the first X-Y movement to issue at least four different functions; and
      the expression mode causes the first X-Y movement to issue expression commands based on at least pad presses in the X and Y directions.

2. The foot-controlled device of claim 1, wherein pressing down on the pad causes the shaft to descend into the base and restrict the pad from moving in the X and Y directions, wherein the controller sends Z information to the computing device based on the pad being pressed down the Z-axis.

3. The foot-controlled device of claim 1, wherein the function mode operates according to a profile that determines which functions are issued based on the X-Y information.

4. The foot-controlled device of claim 1, further including:
   a driver that is installed at the computing device, wherein the driver performs stages including:
      determining which of the at least three modes that the foot-controlled device is in;
      based on the determined mode, determining how to use information from the controller to control the computing device, including at least some information based on the first X-Y movement.

5. The foot-controlled device of claim 4, wherein the driver performs further stages including determining whether to issue a left click or right click command based on information from the controller than indicates shaft rotation.

6. The foot-controlled device of claim 4, wherein the driver requests information from an operating system of the computing device to identify a current application, and selects a function to perform based on both the current application and X-Y movement direction on the pad.

7. The foot-controlled device of claim 1, further comprising a sheath that prevents the shaft from moving in the Z direction, wherein the shaft is hinged to allow pad movement in the X and Y directions, and a separate button is pressed when the pad moves a threshold amount down the Z axis.

8. The foot-controlled device of claim 7, wherein a set of springs separate the pad from the sheath.

9. A foot-controlled device, including:
   a pad that receives movements from a foot that include up, down, left, and right directions for moving a mouse pointer in an X and Y plane;
   a shaft oriented on a Z axis relative to the pad;
   a Z-button that detects pad movement along the Z axis;
   a controller that reports pad movements to a computing device, wherein the controller sends a signal to switch modes that causes the computing device to treat a same pad movement differently depending on the mode; and
   a foot switch that switches between at least three modes, including a mouse mode, a function mode, and an expression mode, wherein:
      the mouse mode causes a first X-Y movement on the pad to control a cursor on a screen;
      the function mode causes the first X-Y movement to issue at least four different functions; and the expression mode causes the first X-Y movement to issue expression commands based on pad presses in the X and Y directions.

10. The foot-controlled device of claim 9, wherein the Z-button is separate from the shaft and inaccessible from an outer housing of the foot-controlled device.

11. The foot-controlled device of claim 9, further including a sheath separated from the pad by a set of springs, wherein the springs return the pad to a neutral position.

12. The foot-controlled device of claim 9, wherein the function mode operates according to a profile that determines which functions are issued based on the X and Y directions of the pad.

13. The foot-controlled device of claim 12, further including:
a plugin that is installed at the computing device, wherein the plugin performs stages including:
determining which of the different modes the foot-controlled device is in;
based on the determined mode, determining how to use information from the controller to control the computing device, the information including the first X-Y movement.

14. The foot-controlled device of claim 13, wherein the driver requests information from an operating system of the computing device to identify a current application, and selects a function to perform based on both the current application and movement direction on the pad.

15. The foot-controlled device of claim 9, further including a sheath that prevents the shaft from moving in the Z direction, wherein the shaft is hinged to allow pad movement in the X and Y directions, and a separate button is pressed when the pad moves a threshold amount down the Z axis.

16. A method for controlling a computing device, the method comprising:
determining an operation mode of a foot-controlled device based on signals received from the foot-controlled device, wherein the operation mode is selected from a group of modes that includes a mouse mode, a functional mode, and an expression mode;
receiving first X-Y information from the foot-controlled device based on a location of a foot pad of the foot-controlled device along an X-axis and a Y-axis;
receiving Z information from the foot-controlled device based on a location of the foot pad along the Z-axis;
when the operation mode is the mouse mode, performing first stages including:
comparing the first X-Y information against prior second X-Y information to determine a movement vector; and
issuing a click command based on the Z information;
when the operation mode is the functional mode, performing second stages including:
activating a first hotkey based on the first X-Y information; and
activating a second hotkey based on the Z information; and
when the operation mode is the expression mode, determining multiple expression commands at once from the relative position of the pad.

17. The method of claim 16, wherein the function mode operates according to a profile that determines which functions are issued based on the X-Y information.

18. The method of claim 17, wherein the foot-controlled device includes a second foot switch for issuing a right click action to the computing device.

19. The method of claim 16, wherein the first hotkey performs different functions based on whether a first or second application is currently open and in a foreground on a computing device.

20. The method of claim 19, wherein an operating system of the computing device indicates which of the first and second applications is in the foreground.

* * * * *